United States Patent [19]

Králíček et al.

[11] 4,303,778
[45] Dec. 1, 1981

[54] METHOD OF ANIONIC POLYMERIZATION OF ω-AMINOACID LACTAMS WITH ALKALI METAL-AL,B-ALKOXY LACTAMATE INITIATOR

[75] Inventors: Jaroslav Králíček, Prague; Vladimír Kubánek, Kralupy; Jiří Mařík; Jaroslava Kondelikova, both of Prague; Jiří Macháček, Kralupy; Bohuslav Čásensky, Prague, all of Czechoslovakia

[73] Assignee: Vysoka skola chemicko-technologicka, Prague, Czechoslovakia

[21] Appl. No.: 870,078

[22] Filed: Jan. 17, 1978

Related U.S. Application Data

[62] Division of Ser. No. 749,239, Dec. 10, 1976, abandoned.

[30] Foreign Application Priority Data

Dec. 10, 1975 [CS] Czechoslovakia ............... 8392/75
Dec. 10, 1975 [CS] Czechoslovakia ............... 8397/75

[51] Int. Cl.$^3$ ............................................. C08G 69/20
[52] U.S. Cl. ........................................ 528/312; 528/315; 528/319; 528/323; 528/325; 528/326
[58] Field of Search .................. 260/78 L, 78 P; 528/312, 319, 315

[56] References Cited

U.S. PATENT DOCUMENTS 3,919,175 11/1975 Kralicek et al. ............... 260/78 L
4,124,584 11/1978 Casensky et al. ............... 528/319

Primary Examiner—Harold D. Anderson

[57] ABSTRACT

A method is described for the anionic polymerization and copolymerization of ω-aminoacid lactams. This end is attained at elevated temperatures in the presence of a polymerization initiator of the formula $$MeZX_mL_n$$

wherein Me is an alkali metal, Z is boron or aluminum, X is an alkoxy group and L is an organic residue derived from a lactam and being of the formula

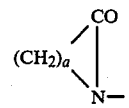

wherein a is an integer in the range 3–11, m is an integer in the range of 0–3, (m+n) is 4 and n is (4−m).

2 Claims, No Drawings

METHOD OF ANIONIC POLYMERIZATION OF ω-AMINOACID LACTAMS WITH ALKALI METAL-AL,B-ALKOXY LACTAMATE INITIATOR

This is a division of application Ser. No. 749,239, filed Dec. 10, 1976, now abandoned.

This invention relates to a method for effecting the polymerization and copolymerization of ω-aminoacid lactams. More particularly, the present invention relates to the anionic polymerization and copolymerization of ω-aminoacid lactams employing an alkali metal salt of a lactam as an initiator.

In recent years, the prime focus of workers in the aminoacid lactam field has been the development of novel initiators for polymerization and copolymerization reactions. The most commonly used materials for this purpose have been alkali metal salts of lactams. These compositions have heretofore been prepared by reacting strong alkaline compounds which are capable of forming lactam anions by reaction with lactams. Typical materials employed for this purpose are the alkali metals, and hydrides, hydroxides, alcoholates, carbonates, organometallic derivatives thereof, Grignard reagents, etc.

Unfortunately, numerous difficulties have been encountered in the preparation of such salts, with equipment limitations and economic considerations being the prime deterents. In many cases is has been found that the completion of the reactions lead not only to the formation of the desired salt but also to the formation of by-products that serve as inhibitors of anionic polymerization. It has also been observed that in the preparation of the alkali metal lactam salts from hydroxides and alcoholates, reaction water or alcohol, respectively, is required to be removed by distillation, under reduced pressure of the first lactam fraction, thereby resulting in loss monomer. Additionally, equipment limitations dictated by the use of a strongly alkaline medium create prohibitive manufacturing costs.

Perhaps the most significant advance in this field in recent years was the development of an initiator comprising a modified alkoxyaluminium hydride of an alkali metal, as described in Czechoslovakian Pat. No. 154,991. The chief advantage of these compounds was found to be a reduction in sensitivity to water present in lactam, that is, they react with water to yield products which are substantially inert to the polymerization process. Additionally, the alkoxyaluminum hydrides were easy to handle from a safety standpoint and were readily soluble in melted lactam. And, of even greater significance was the fact that sodium dihydro- bis (2-methoxyethoxy) is readily available from commercial sources.

Nevertheless, even this initiator was found to have limitations, namely a slow rate of polymerization and the evolution of hydrogen during reaction with the lactams, which again imposes safety restrictions.

In accordance with the present invention, these prior art limitations are effectively obviated by means of a novel polymerization-copolymerization reaction utilizing novel initiators. In brief, the inventive technique involves anionic polymerization and copolymerization of ω-aminoacid lactams with an initiator of the formula $$M_e Z X_m Y_n$$

wherein $M_e$ is an alkali metal selected from among lithium, sodium and potassium, Z is selected from among aluminum and boron, X is an alkoxy group of 3–6 carbon atoms, and Y is an organic residue derived from lactam by the abstraction of a hydrogen atom bonded to a nitrogen atom and being of the formula

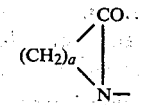

wherein a is an integer in the range of 3–11, m is an integer in the range of 0–3, the sum of m+n is 4 and n equals (4−m).

The described initiators are found to be capable of forming the desired salts or corresponding anions when reacted with lactams. The initiators may be employed either in solid form or as a solution in an inert solvent such as benzene, toluene, xylene, etc. It is of particular significance to note that the initiators employed are relatively insensitive to water present in lactams and evidence significantly lower sensitivity thereto than the aforementioned alkylsodiumaluminum hydrides while maintaining all the advantages of the latter. Furthermore, the described initiators cannot cause evolution of hydrogen since that element is absent, thereby easing apparatus requirements. The initiators may be employed in amounts ranging up to one half mol percent and in quantities as low as $5 \times 10^{-3}$ mols.

From a mechanistic standpoint, it is well to note that the chemical properties and branching in the alkoxy group promote a polymerization rate which is higher than that obtained with the alkoxysodium-aluminum hydrides. However, the polymerization rate is found to increase with a decreasing number of branched alkoxy groups and reaches a maximum when m is 0, that is, when aluminum or boron are bonded exclusively to 4 lactam groups. This factor is important with relation to both the capacity and productivity of a continuous system.

Studies have revealed that polymerization in the presence of such catalysts can be effected either at temperatures below or above the melting temperature of the polymer by an adiabiatic process in the case of the former and by use of a continuous system in the case of the latter. Suitable temperatures may range from 40° C. to greater than 260° C.

Lactams found amenable to polymerization in the foregoing manner include caprolactam, caprylolactam, enantholactam, butyrolactam, decanolactam, laurylolactam and mixtures thereof of by use of their alkylated derivatives. The reaction mixture may also include solid or liquid fillers, glass, metal powder, pigment, etc., and any of the known activators such as N-acyllactams, N-aryllactams, isocyanates, esters, anhydrides, carbodiimides, etc.

The ω-aminoacid lactam polymers produced in accordance with the present invention are solid in nature and evidence a partially crystalline structure. These polymers are known in the art and it has been recognized that at temperatures in excess of the melting point a polymer melt is obtained which, when cooled to ambient temperature, also forms a partially crystalline substance (See *Nylon Plastics*, edited by J. M. Kohan, John Wiley & Sons, New York, 1973). Typical articles made from such polymers include machinery construction materials such as bearings, gears and other materials normally exposed to stresses. Bulk products of this type can be prepared by low temperature polymerization below the polymer melting point. At temperatures above the melting point, polymer chips for use in transfer molding techniques, normally employing ordinary nylon tapes, are obtained. Products so obtained are similar to those obtained from orthodox nylon plastics.

Several examples of the present invention are set forth below. These examples are merely for purposes of exposition and are not to be considered as limiting.

EXAMPLE 1

0.3 mol % of

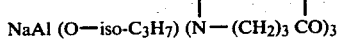

in the form of a 58.8% by weight toluene solution where added to 736 g of anhydrous 6-caprolactam while stirring at 100° C. 0.3 mol % of phenylisocyanate trimer were added at a polymerization temperature of 135° C. The polymerization halftime was 9.5 minutes and the water extract 2.8 wt. %.

EXAMPLE 2

$5 \times 10^{-3}$ mol of a 57.6 weight percent solution of toluene and

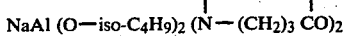

were added to a melted mixture of 6-caprolactam (90 mol. %) and 12-laurolactam (10% mol.) at 120° C. $5 \times 10^{-2}$ mol of 1.5-naphthalendiisocyanate were added to the monomer mixture at 120° C. The polymerization halftime was 20 minutes and the water extract 2.8 wt. %.

EXAMPLE 3

0.3 mol % of

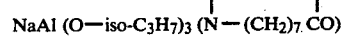

were added to 2 mols of a solid caprolactam and the mixture was melted under nitrogen and heated to 260° C. The polymerization occurred after the addition of 0.5 mol % of N-benzoylcaprolactam. The equilibrium content of the polymer after 15 minutes of polymerization was 89.1 wt. %.

EXAMPLE 4

$3 \times 10^{-3}$ mols of an 86 weight percent benzene solution of

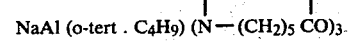

and $3 \times 10^{-3}$ mols of N-benzoyl caprolactam were added to 0.5 mol of 12-laurolactam under continuous stirring at 157° C. in a stainless polymerization reactor. The polymerization halftime was 21 minutes and the polymer content was 98.9 wt. %.

EXAMPLE 5

1 mol of pyrrolidone was melted at 37° C., and $5 \times 10^{-3}$ mols of

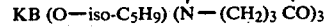

were added in the form of a 56 wt. % solution of toluene. The polymerization was carried out at 42° C. with $5 \times 10^{-3}$ mols of N-benzoyl caprolactam. The polymer content was 44.7 wt. % after 48 hours of polymerization.

EXAMPLE 6

0.3 mol % of a 46.2% wt. solution of

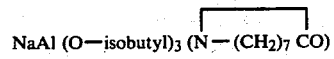

in benzene and 0.3 mol % of trimer of phenylisocyanate were added successively to a melted mixture of 0.9 mol of caprolactam and 0.1 mol of caprylolactam at 136° C. The polymerization halftime was 9 minutes and the water extract 2 wt. %.

EXAMPLE 7

17.8 mol of a 57.5 wt. % toluene solution of

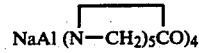

were added to 731 g of water-free caprolactam at 95° C., and the mixture homogenized by stirring. After attaining a temperature of 135° C., 2.32 grams of trimer of phenylisocyanate were added. The polymerization halftime under adiabatic conditions was 6.5 minutes, and the polymer content 97.2 wt. %. For comparative purposes, the polymerization halftime under the same conditions in the presence of sodium dihydro-bis (2-methoxyethoxy) aluminate was 21 minutes.

EXAMPLE 8

$3 \times 10^{-3}$ mol of solid

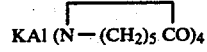

were added to a mixture of 0.5 mol of 6-caprolactam and 0.5 mol of 8-caprylolactam. Next, $3 \times 10^{-3}$ mols of N-acetyl-6-caprolactam were added to the melted reaction mixture while stirring at 105° C. The polymerization halftime of 23 minutes and the polymer contained 1.8 wt. % of water soluble components.

EXAMPLE 9

0.3 mol % of

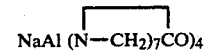

and 0.3 mol % of phenylisocyanate were added successively to a melted mixture of 60 mol % of 6-caprolactam and 40 mol % of 12-laurolactam at 120° C. The polymerization halftime was 11 minutes and the water extract was 1.9 wt. %.

EXAMPLE 10

0.5 mol of water-free 8-caprylolactam dried by distilling of the first fraction under reduced pressure were heated at 110° C., and 0.25 mol % of

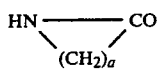

and 0.25 mol % of N-benzoylcaprolactam were added. The polymerization halftime was 11.5 minutes and the polymer content was 98.6%.

What is claimed is:

1. A method for the anionic polymerization of at least one ω-aminoacid lactam of the formula

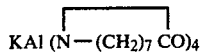

wherein a is an integer ranging from 3 to 11 which comprises effecting polymerization at elevated temperatures in the presence of an initiator for the anionic polymerization of lactams, said initiator having the formula $$MeZX_mL_n$$

wherein Me is an alkali metal selected from the group consisting of lithium, sodium and potassium, Z is selected from the group consisting of aluminum and boron, X is an alkoxy group of 3 to 6 carbon atoms and L is an organic residue derived from lactam of the formula

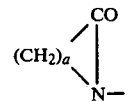

wherein a is an integer from 3 to 11, m is an integer selected from 0, 1 and 3, the sum of m+n is 4, or n is (4-m) and an activator for the anionic polymerization of lactam, so resulting in a solid crystalline lactam polymer.

2. Method in accordance with claim 1, wherein said activator is an isocyanate.

* * * * *